US009552296B2

(12) United States Patent
Huynh et al.

(10) Patent No.: US 9,552,296 B2
(45) Date of Patent: Jan. 24, 2017

(54) VERIFYING SHARED MEMORY INTEGRITY

(71) Applicant: International Business Machines Corporation, Armonk, NY (US)

(72) Inventors: Duy Q Huynh, Cedar Park, TX (US); Lyndsi R McKinney, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/842,935

(22) Filed: Mar. 15, 2013

(65) Prior Publication Data
US 2014/0281195 A1 Sep. 18, 2014

(51) Int. Cl.
*G06F 13/00* (2006.01)
*G06F 12/08* (2016.01)

(52) U.S. Cl.
CPC ......... *G06F 12/084* (2013.01); *G06F 12/0806* (2013.01); *G06F 12/0813* (2013.01); *G06F 12/0815* (2013.01); *G06F 12/0842* (2013.01); *G06F 12/0828* (2013.01); *G06F 12/0831* (2013.01); *G06F 12/0866* (2013.01)

(58) Field of Classification Search
None
See application file for complete search history.

(56) References Cited

U.S. PATENT DOCUMENTS

| | | | |
|---|---|---|---|
| 5,588,131 A * | 12/1996 | Borrill | 711/143 |
| 5,673,388 A | 9/1997 | Murthi et al. | |
| 6,158,000 A | 12/2000 | Collins | |
| 6,381,715 B1 | 4/2002 | Bauman et al. | |
| 7,024,603 B1 | 4/2006 | Lin et al. | |
| 7,093,166 B2 | 8/2006 | Mohammad | |
| 7,251,744 B1 | 7/2007 | Housty | |
| 7,480,768 B2 | 1/2009 | Li et al. | |
| 7,739,570 B2 | 6/2010 | Bag et al. | |
| 7,743,191 B1 * | 6/2010 | Liao | 710/240 |
| 7,779,393 B1 | 8/2010 | Manovit et al. | |
| 7,797,480 B2 | 9/2010 | Mokhlesi et al. | |
| 7,849,258 B2 | 12/2010 | Sato et al. | |
| 7,934,256 B2 * | 4/2011 | Matsushima | G06F 21/57 713/165 |
| 7,958,413 B1 | 6/2011 | Lee et al. | |
| 8,028,133 B2 | 9/2011 | Dice et al. | |
| 8,028,154 B2 | 9/2011 | Yu et al. | |
| 8,181,072 B2 | 5/2012 | Dohji et al. | |
| 8,239,635 B2 | 8/2012 | Lev et al. | |
| 8,346,843 B2 * | 1/2013 | Jain | 709/201 |
| 8,595,267 B2 * | 11/2013 | Sivasubramanian et al. | 707/803 |
| 2003/0200448 A1 * | 10/2003 | Foster et al. | 713/189 |
| 2007/0109858 A1 * | 5/2007 | Conley et al. | 365/185.11 |

(Continued)

OTHER PUBLICATIONS

Murray, Matthew. "DDR vs. DDR2 vs. DDR3: Types of RAM Explained." PCMAG, Feb. 28, 2012. Web.*

*Primary Examiner* — Midys Rojas
*Assistant Examiner* — Stephanie Wu
(74) *Attorney, Agent, or Firm* — Yudell Isidore PLLC

(57) ABSTRACT

A method, a system and a computer program product including instructions for verification of the integrity of a shared memory using in line coding is provided. It involves an active step wherein multiple bus masters write a corresponding data to a shared memory. After that it also includes a verification step where data entered in the shared memory by multiple bus masters is verified.

19 Claims, 6 Drawing Sheets

(56) References Cited

U.S. PATENT DOCUMENTS

2008/0294648 A1* 11/2008 Lin et al. .................... 707/10
2011/0289280 A1* 11/2011 Koseki et al. ............... 711/154
2012/0095974 A1* 4/2012 Bentkofsky et al. ......... 707/703

* cited by examiner

| Transaction Description | Memory Contents |
|---|---|
| Master X writes 1 byte to memory at address 0x00. | 0x00 \| X |
| Master Y writes 1 byte to memory at address 0x00. | 0x00 \| Y |
| Master Z writes 1 byte to memory at address 0x00. | 0x00 \| Z |
| Master X reads 1 byte of memory at address 0x00 and it is not a match. | 0x00 \| Z |
| Master Y reads 1 byte of memory at address 0x00 and it is not a match. | 0x00 \| Z |
| Master Z reads 1 byte of memory at address 0x00 and it is a match. | 0x00 \| Z |

Fig. 6

VERIFYING SHARED MEMORY INTEGRITY

FIELD OF INVENTION

This invention relates generally to a method and a system to verify shared memory, more particularly the invention relates to a method and a system to verify shared memory using in-line coding.

BACKGROUND

In computer hardware, shared memory refers to a block of memory that can be accessed by multiple bus masters in a multiple bus master computer system. A shared memory system is relatively easy to program since all bus masters share a single view of data and the communication between the bus masters can be as fast as memory accesses at same locations.

However, in a system where shared memory is being used, there is a problem of inconsistent memory data. This data which may be written by one of the multiple bus masters may or may not be correct when written. Therefore, it is very difficult to rely on the data written and read from the multiple bus master computer system and hence memory integrity needs to be checked.

In a system containing a single master, a simple means to verify memory integrity is through an in-line write modify read. Specifically, every write initiated by the master is immediately read back by that master to check that the data read back is the same as the data written.

In systems containing multiple masters, elaborate methods of verifying memory integrity are utilized because of a need to verify potential overlapping writes from multiple bus masters or from the same bus master. Some of the common methods are monitoring memory transactions, extracting the content of the external memory model and validating them using a reference model or a Post processing memory dump.

One of these involves both the instantiation of complex Verilog models and supporting code whereas, and the other, though simplistic, still require a large amount of code to parse and match all memory transactions.

Therefore, in light of the above discussion there is a need of a method and a system that allows easy verification of the integrity of a shared memory without involving parsing large amounts of code or using complex mathematical models.

BRIEF SUMMARY

In one embodiment of the invention, a method for verification of the integrity of a shared memory using in line coding is provided. The method involves an active step wherein multiple bus masters write a corresponding data to a shared memory. Each of the multiple bus masters writes corresponding data to at least one memory unit from a plurality of memory units in the shared memory. After, the writing step, a status database is updated, wherein the status database keeps a record of the modification of the memory. The status database is updated to modified state every time a bus master writes to a memory unit. The active step is followed by a verification step which includes reading back of the corresponding data. The read back operation is performed by each of plurality of bus masters which has written the corresponding data during the active step. This read back data is then compared with an expected data which is the data which has been written by the plurality of bus masters during active step. If the read back data matches the expected data then the status database is updated to a verified state. However, when the read back data does not match the expected data, then the status in the status database is maintained to modified status only.

In another embodiment of the invention, a system for verification of the integrity of a shared memory using in line coding is provided. The system includes a write module which helps multiple bus masters to write corresponding data to the shared memory. Each of the multiple bus masters writes corresponding data to at least one memory unit from a plurality of memory units in the shared memory. The system further includes a read module which reads back the corresponding data written by each of the plurality of bus masters. The system also includes a compare module which compares the read back data with an expected data wherein the expected data is the data which has been written by the plurality of bus masters thorugh the write module. The system further includes an update module which helps in updating of a status database during the operation of the write module and after the operation of the compare module. The update module updates the status database to modified state when the write module writes the data of the plurality of bus masters on to the shared memory. Also, after he compare module has matched the corresponding read back data with the expected data, the update module updates the status of the status database to verified state or maintains the status of the status database to modified on occasion of a mismatch between the read back data and the expected data.

In further embodiment of the invention, a computer program product for verification of the integrity of a shared memory using in line coding is provided. The method involves an active step wherein multiple bus masters write a corresponding data to a shared memory. Each of the multiple bus masters writes corresponding data to at least one memory unit from a plurality of memory units in the shared memory. After, the writing step, a status database is updated, wherein the status database keeps a record of the modification of the memory. The status database is updated to modified state every time a bus master writes to a memory unit. The active step is followed by a verification step which includes reading back of the corresponding data. The read back operation is performed by each of plurality of bus masters which has written the corresponding data during the active step. This read back data is then compared with an expected data which is the data which has been written by the plurality of bus masters during active step. If the read back data matches the expected data then the status database is updated to a verified state. However, when the read back data does not match the expected data, then the status in the status database is maintained to modified status only.

In another embodiment of the invention, a method for verification of the integrity of a coherent shared memory using in line coding is provided. The method involves an active step wherein multiple bus masters write a corresponding data to a shared memory. Each of the multiple bus masters writes corresponding data to at least one memory unit from a plurality of memory units in the shared memory. After, the writing step, a status database is updated, wherein the status database keeps a record of the modification of the memory. The status database is updated to modified state every time a bus master writes to a memory unit. The active step is followed by a rewriting step wherein the data present in corresponding cache of every bus master is rewritten to the coherent shared memory. This step is followed by a verification step which includes reading back of the corresponding data. The read back operation is performed by each of plurality of bus masters which has written the corresponding data during the active step. This read back data is then compared with an expected data which is the data which has been written by the plurality of bus masters during active step. If the read back data matches the expected data then the status database is updated to a verified state. However, when the read back data does not match the expected data, then the status in the status database is maintained to modified status only.

These and other objectives of the present invention will no doubt become obvious to those of ordinary skill in the art after reading the following detailed description of various embodiments that will be illustrated in the various figures and drawings.

BRIEF DESCRIPTION OF DRAWINGS

The features of the present invention, which are believed to be novel, are set forth with particularity in the appended claims. The invention may best be understood by reference to the following description, taken in conjunction with the accompanying drawings. These drawings and the associated description are provided to illustrate some embodiments of the invention, and not to limit the scope of the invention.

FIG. 6 is an exemplary embodiment in which the method as described in the above figures is carried out.

Figure 1:
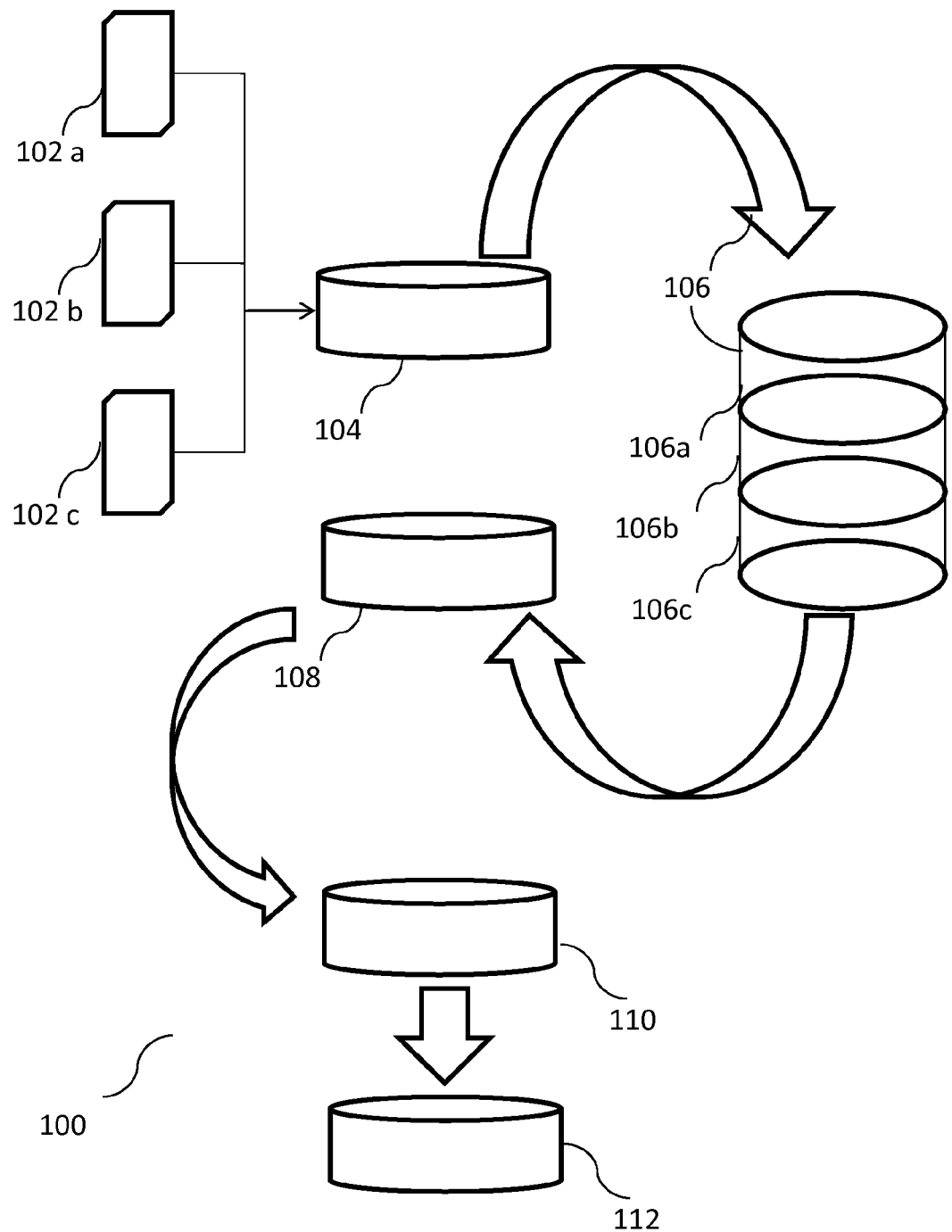
FIG. 1 is a block diagram of an embodiment of a system for verification of integrity of a shared memory, in accordance with an embodiment of the present invention.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention.

There may be additional structures described in the foregoing application that are not depicted on one of the described drawings. In the event such a structure is described, but not depicted in a drawing, the absence of such a drawing should not be considered as an omission of such design from the specification.

DETAILED DESCRIPTION

Before describing the present invention in detail, it should be observed that the present invention utilizes a combination of method steps and apparatus components related to a method and system for checking memory integrity. Accordingly the apparatus components and the method steps have been represented where appropriate by conventional symbols in the drawings, showing only specific details that are pertinent for an understanding of the present invention so as not to obscure the disclosure with details that will be readily apparent to those with ordinary skill in the art having the benefit of the description herein.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Also, it should be observed that the present invention utilizes a combination of method steps and system components related to computer-implemented method for verifying memory integrity. Accordingly, it will be appreciated that embodiments of the invention described herein may include one or more conventional processors and unique stored program instructions that control the one or more processing units to implement, in conjunction with certain non-processor circuits, some, most, or all of the functions of the method of verifying memory integrity. The non-processor circuits may include, but are not limited to, a radio receiver, a radio transmitter, signal drivers, clock circuits, power source circuits, and user input devices. As such, these functions may be interpreted as steps of a method to perform the display. Methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

FIG. 1 is a block diagram of a system 100 for verification of integrity of a shared memory in accordance with an embodiment of the present invention. The system 100 includes a plurality of bus masters 102a, 102b and 102c. The bus masters are able to write their corresponding data to a shared memory 106 which includes a plurality of memory units 106a, 106b and 106c.

In an embodiment of the invention, the plurality of bus masters 102a, 102b and 102c can be any one of, but is not limited to, a PPC440, a PPC464 and a DMA. However, it should be appreciated that in other embodiments of the invention other similar bus masters can also be used without deviating from the scope of the invention.

In another embodiment of the invention the shared memory 106 can be any one of, but is not limited to, a DDR1, a DDR2, a DDR3 and an SRAM. However, it should be appreciated that in other embodiments of the invention other similar memories can also be used without deviating from the scope of the invention.

In yet another embodiment of the invention, the plurality of memory units 106*a*, 106*b* and 106*c* can be one of, but is not limited to 4, 8, 16, 32, 64, 128, 256, and 512 bits. However, it should be appreciated that in other embodiments of the invention other similar memory units can also be used without deviating from the scope of the invention.

The system 100 further includes a write module 104 through which each of the plurality of bus masters 102*a*, 102*b* and 102*c* are able to write their corresponding data to at least one of the plurality of memory units 106*a*, 106*b* and 106*c*.

Moving further, the system 100 also includes a read module 108 that helps each of the plurality of bus masters 102*a*, 102*b* and 102*c* to read back the corresponding data written by each of the plurality of bus masters 102*a*, 102*b* and 102*c* to at least one of the plurality of memory units 106*a*, 106*b* and 106*c*.

Furthermore, a compare module 110 is included in the system 100, which enables the comparison of the read back data and an expected data that is the corresponding data written by at least one of the plurality of bus masters 102*a*, 102*b* and 102*c* to at least one of the plurality of memory units 106*a*, 106*b* and 106*c*.

The system 100 also includes an update module 112 which updates and/or maintains the status of a status database. The status database is updated to a modified state when any one of the plurality of bus masters 102*a*, 102*b* and 102*c* writes any data to any of the plurality of memory units 106*a*, 106*b* and 106*c* of the shared memory 106.

The update module 112 updates the status of the status database to verified when the read back data and the expected data written by at least one of the plurality of bus masters 102*a*, 102*b* and 102*c* match. However, when there is a mismatch between the read back data and the expected data written by at least one of the plurality of bus masters 102*a*, 102*b* and 102*c*, the update module maintains the status of the status database to modified.

Figure 2:
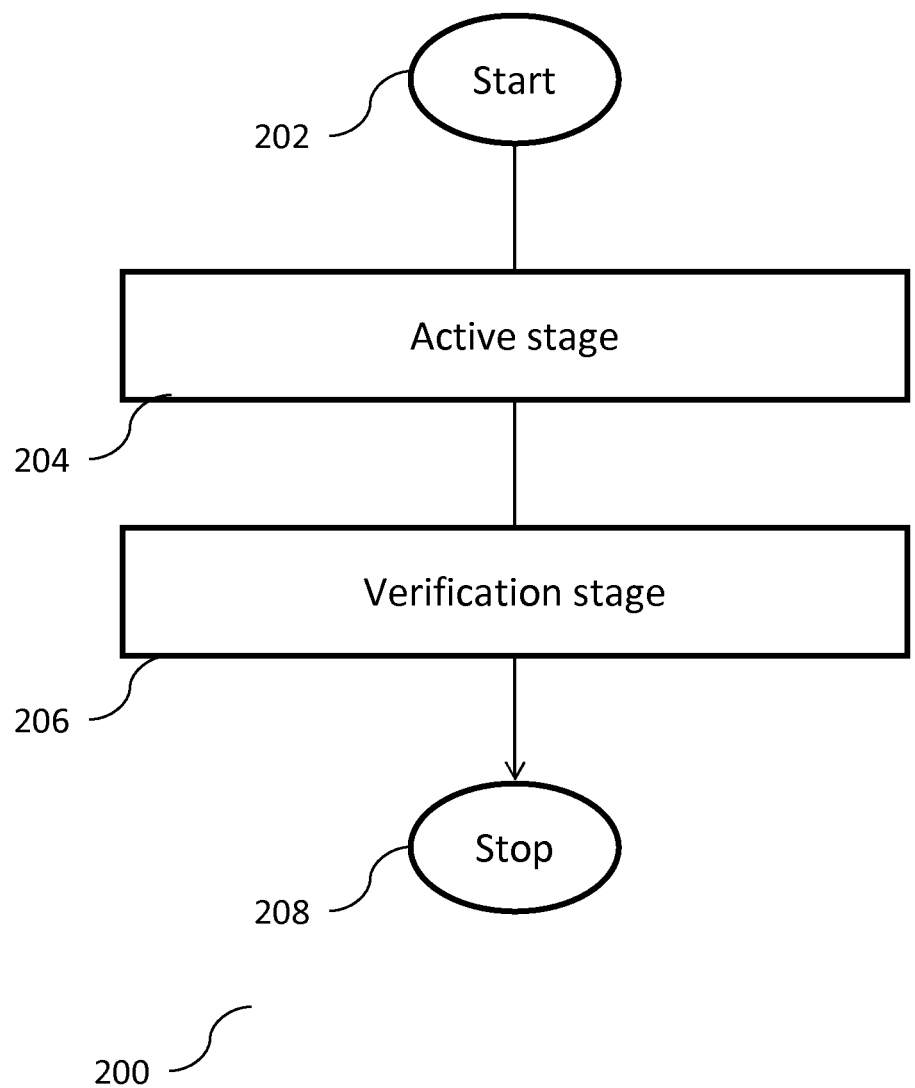
FIG. 2 is a flow chart depicting a process flow of a method of verifying integrity of a shared memory, in accordance with an embodiment of the present invention.

Moving on, FIG. 2 is a flow chart depicting the process flow of a method 200 according to an embodiment of the invention. It should be appreciated that the references will be made to FIG. 1 while describing the method 200 of FIG. 2. The method 200 is instigated at step 202. Further at step 204 of the method 200, an active stage step is performed. In active stage step 204, a plurality of bus masters 102*a*, 102*b* and 102*c* perform a write operation on a shared memory 106. The shared memory 106 is made up of a plurality of smaller memory units 106*a*, 106*b* and 106*c*. During the write operation each of the plurality of bus masters 102*a*, 102*b* and 102*c* write a corresponding data to at least one of the plurality of memory units 106*a*, 106*b* and 106*c* of the shared memory 106. The active stage step 204 will be explained in detail while describing FIG. 4. At step 206 a verification stage step is performed. At this stage the corresponding data written by each of the plurality of bus masters 102*a*, 102*b* and 102*c* is read back and compared with an expected data. The expected data is the corresponding data written by at least one of the plurality of bus masters 102*a*, 102*b* and 102*c* to at least one of the plurality of memory units 106*a*, 106*b* and 106*c*. This comparison of data is followed by updating of a status database by an update module 112. The verification stage step 206 will be explained in detail while describing FIG. 5. The method 200 is terminated at step 208.

In an embodiment of the invention the plurality of bus masters can be any one of, but not limited to a PPC440, a PPC464 or a DMA. However, it should be appreciated that in other embodiments of the invention other similar bus masters can also be used without deviating from the scope of the invention.

In another embodiment of the invention the shared memory can be any one of, but not limited to a DDR1, a DDR2, a DDR3 or an SRAM. However, it should be appreciated that in other embodiments of the invention other similar memories can also be used without deviating from the scope of the invention.

In yet another embodiment of the invention the plurality of memory units can be of, but not limited to 4, 8, 16, 32, 64, 128, 256, or 512 bits. However, it should be appreciated that in other embodiments of the invention other similar memory units can also be used without deviating from the scope of the invention.

Figure 3:
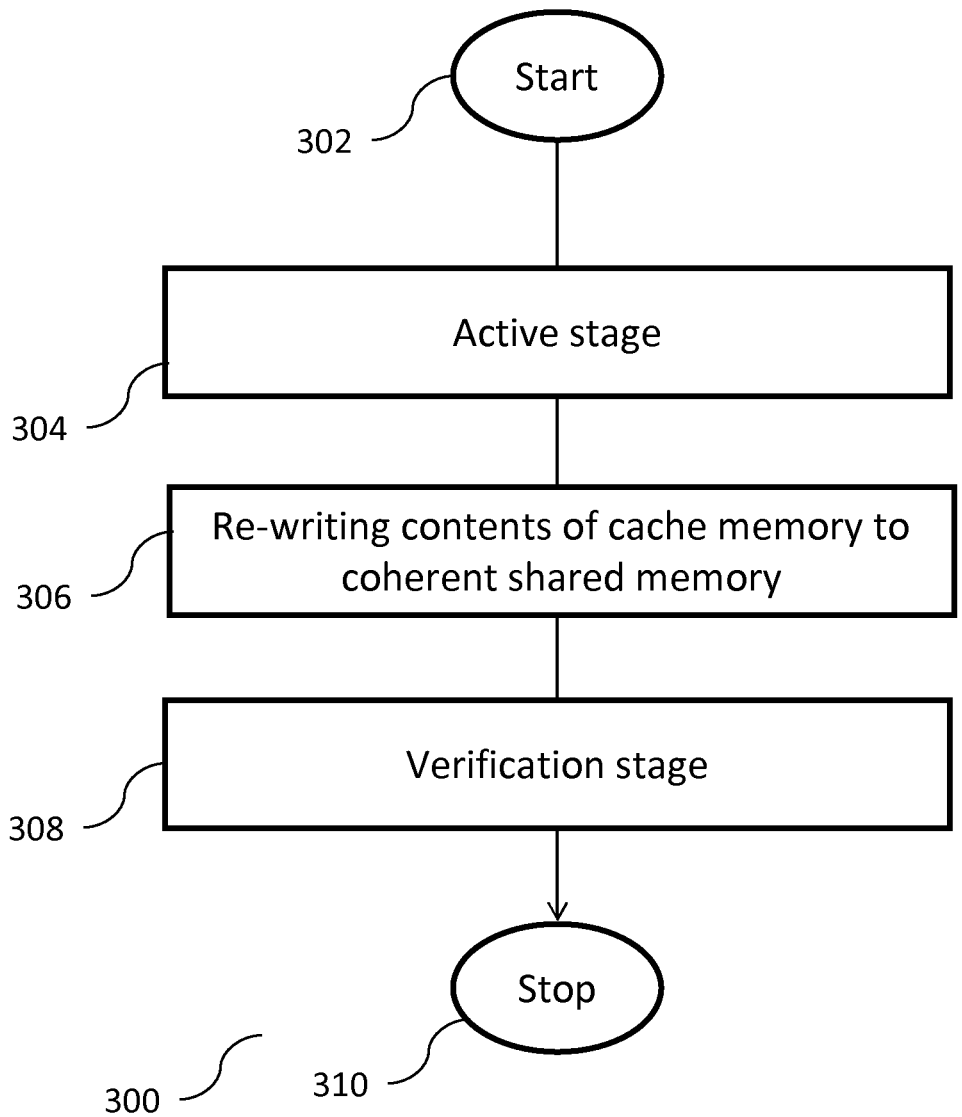
FIG. 3 is a flow chart depicting a process flow of a method of verifying integrity of a coherent shared memory, in accordance with an embodiment of the present invention.

FIG. 3 is a flow chart depicting the process flow of a method 300 according to an embodiment of the invention. References will be made to FIG. 1 while describing the method 300 of FIG. 3. The method 300 is initiated at step 302. Further at step 304 of the method 300, an active stage step is performed. In active stage step 304, a plurality of bus masters 102*a*, 102*b* and 102*c* perform a write operation on a coherent shared memory 106. The coherent shared memory 106 is made up of a plurality of smaller memory units 106*a*, 106*b* and 106*c*. The plurality of bus masters 102*a*, 102*b* and 102*c* include respective cache memories. In a shared memory multiple bus master system with a separate cache memory for each processor, it is possible to have many copies of any one instruction operand: one copy in the shared memory and one in each cache memory. When one copy of an operand is changed, the other copies of the operand must be changed also. Cache coherence is the discipline that ensures that changes in the values of shared operands are propagated throughout the system in a timely fashion.

During the write operation each of the plurality of bus masters 102*a*, 102*b* and 102*c* write a corresponding data to at least one of the plurality of memory units 106*a*, 106*b* and 106*c* of the shared memory 106. The active stage step 304 will be explained in further detail while describing FIG. 4.

After the active stage 304, at step 304 the contents of the corresponding cache memory are rewritten into the coherent shared memory.

At step 308 a verification stage step is performed. At this stage the corresponding data written by each of the plurality of bus masters 102*a*, 102*b* and 102*c* is read back and compared with an expected data. The expected data is the corresponding data written by at least one of the plurality of bus masters 102*a*, 102*b* and 102*c* to at least one of the plurality of memory units 106*a*, 106*b* and 106*c*. This comparison of data is followed by updating of a status database by an update module 112. The verification stage step 308 will be explained in detail while describing FIG. 5. The method 300 ends at step 310.

In an embodiment of the invention the plurality of bus masters can be any one of, but not limited to a PPC440, a PPC464 or a DMA. However, it should be appreciated that in other embodiments of the invention other similar bus masters can also be used without deviating from the scope of the invention.

In another embodiment of the invention the shared memory can be any one of, but not limited to a DDR1, a DDR2, a DDR3 or an SRAM. However, it should be appreciated that in other embodiments of the invention other similar memories can also be used without deviating from the scope of the invention.

In yet another embodiment of the invention the plurality of memory units can be of, but not limited to 4, 8, 16, 32, 64, 128, 256, or 512 bits. However, it should be appreciated that in other embodiments of the invention other similar memory units can also be used without deviating from the scope of the invention.

Figure 4:
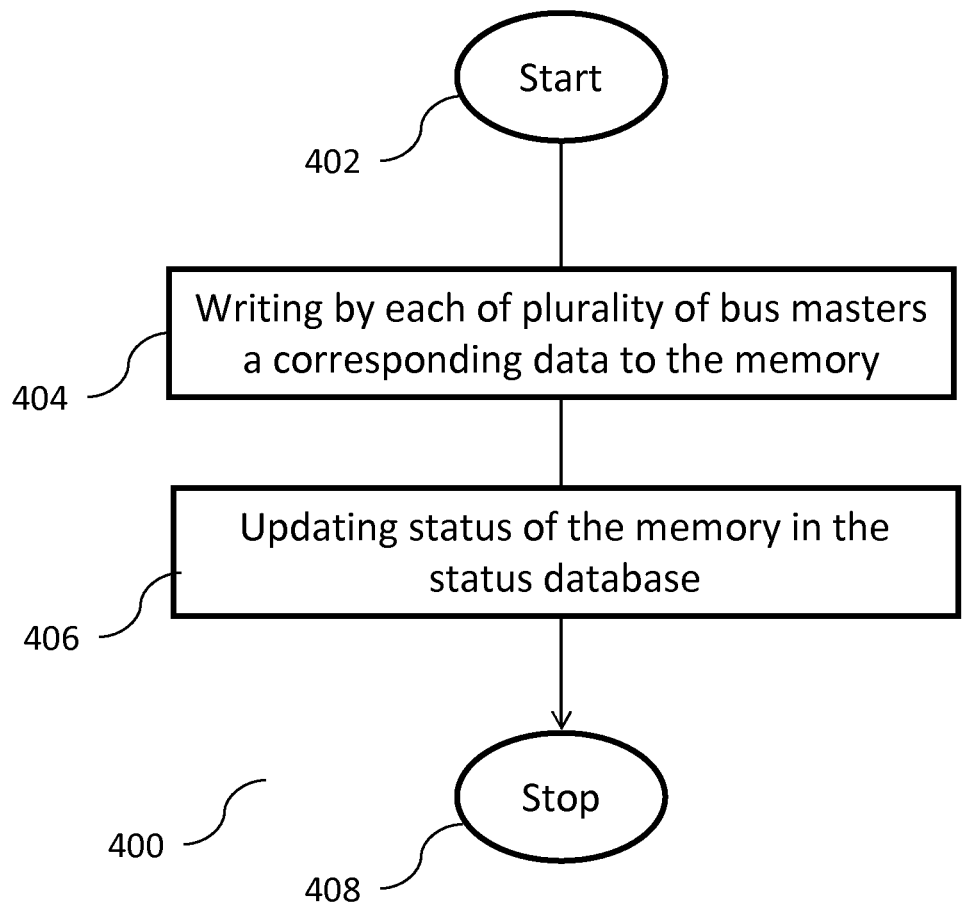
FIG. 4 is a flow chart depicting a detailed process flow of active stage step of method of verifying integrity of a shared memory, in accordance with an embodiment of the present invention as depicted in FIG. 2 and FIG. 3.

FIG. 4 is a flow chart depicting the detailed process of active stage of step 204 of FIG. 2 and step 304 of FIG. 3. References will be made to FIG. 1, FIG. 2 and FIG. 3 to describe the verification stage process 400. The method starts ate step 402. At step 404, each of the plurality of bus masters 102a, 102b and 102c writes a corresponding data to any one of the plurality of memory units 106a, 106b and 106c. After this write operation has been performed, at step 406 the update module 112 updates the status of that memory unit to which data has been written by at least one of the plurality of bus masters 102a, 102b and 102c, to modified. The method 400 ends at step 408.

Figure 5:
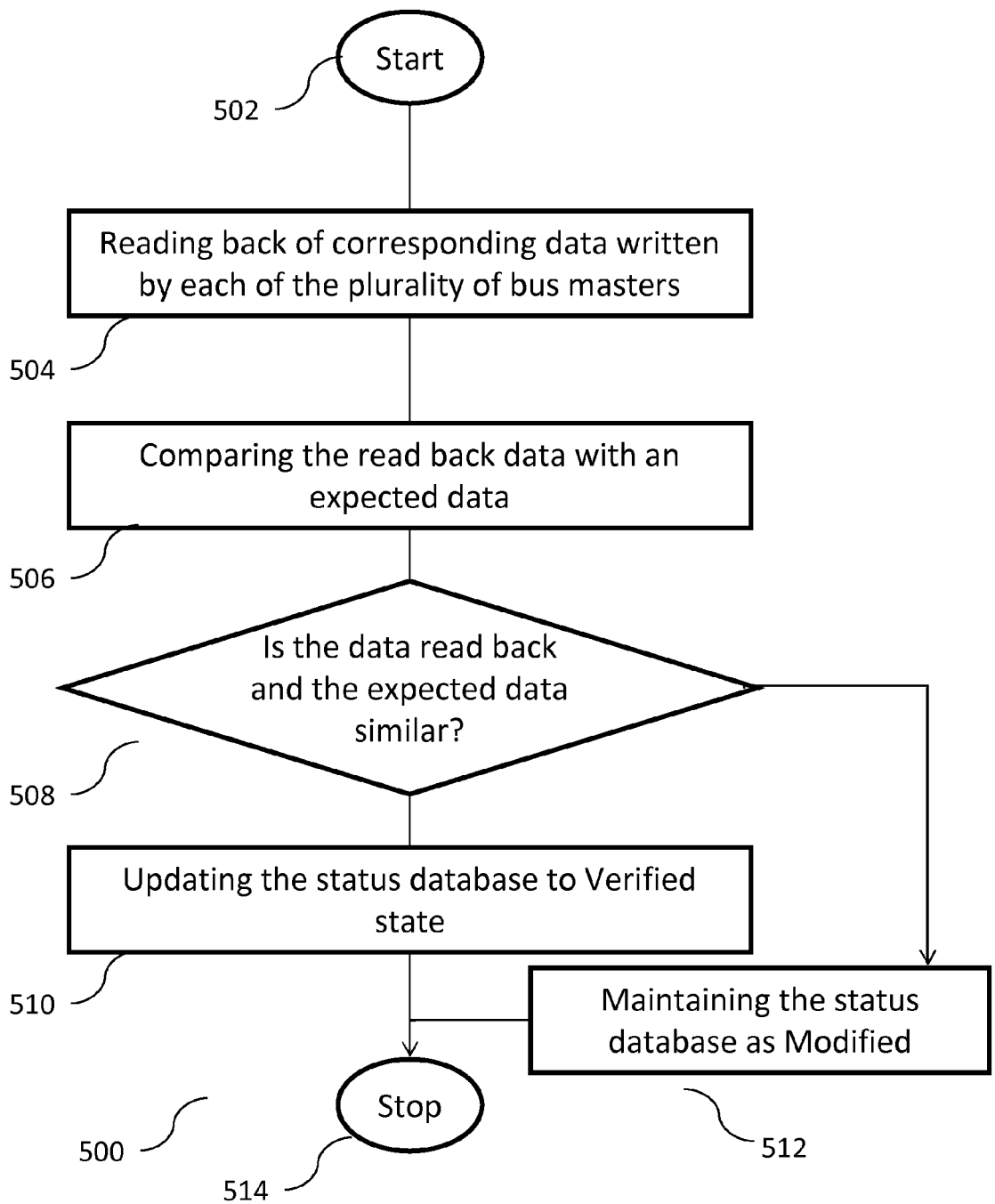
FIG. 5 is a flow chart depicting a detailed process flow of verification stage step of method of verifying integrity of a shared memory, in accordance with another embodiment of the present invention as depicted in FIG. 2 and FIG. 3.

FIG. 5 is a flow chart depicting the detailed process of verification stage of step 206 of FIG. 2 and step 308 of FIG. 3. References will be made to FIG. 1, FIG. 2 and FIG. 3 to describe the verification stage process 500. The method starts ate step 502. Moving further at step 504 the corresponding data which has been written by at least one of the plurality of bus masters 102a, 102b and 102c to at least one of the plurality of memory units 106a, 106b and 106c of the shared memory and/or the coherent shared memory. After write operation has been executed, each of the plurality of bus masters 102a, 102b and 102c will read back the corresponding data written in all of the plurality of memory units that it previously accessed.

At step 506 a comparison is made between the data read back with an expected data which is the data written by at least one of the plurality of bus masters 102a, 102b and 102c onto at least one of the plurality of memory units 106a 106b and 106c of the shared memory and or coherent shared memory.

At step 508, a decision has to be made after the comparison is conducted at step 506. For each of the plurality of memory units 106a, 106b and 106c, if the read back data matches the expected data for that bus master out of the plurality of data bus masters 102a, 102b and 102c, the status for that memory unit is changed from modified to verified in the status database by the update module 112 at step 510. However, if there is any of the plurality of memory unit 106a, 106b and 106c for which the read back data does not match the expected data for any bus master out of the plurality of data bus masters 102a, 102b and 102c the update module 112 maintains the status of the status database to modified at step 512. The method 500 ends at 514.

In an embodiment of the invention the plurality of bus masters can be any one of, but not limited to a PPC440, a PPC464 or a DMA. However, it should be appreciated that in other embodiments of the invention other similar bus masters can also be used without deviating from the scope of the invention.

In another embodiment of the invention the shared memory can be any one of, but not limited to a DDR1, a DDR2, a DDR3 or an SRAM. However, it should be appreciated that in other embodiments of the invention other similar memories can also be used without deviating from the scope of the invention.

In yet another embodiment of the invention the plurality of memory units can be of, but not limited to 4, 8, 16, 32, 64, 128, 256, or 512 bits. However, it should be appreciated that in other embodiments of the invention other similar memory units can also be used without deviating from the scope of the invention.

FIG. 6 is an exemplary embodiment in accordance to the invention described herewith. In FIG. 6 there are three bus masters viz. "X", "Y" and "Z". All write different data to the shared memory. The three write operations occur and then all three of the bus masters read back the data written in the shared memory. While bus master X and Y will report a mismatch, bus master Z reports a match. Because at least one bus master reported this memory unit as a match, this test case would pass.

The invention also provides a computer program product that includes instructions that enables the execution of a method described as per the invention, for example the method 200, the method 300, the method 400 and the method 500. For example, the method may be carried out using instructions of the computer program product executing on one or more suitably configured microprocessors or microcontrollers.

In an embodiment, the computer program product may incorporate various features of the present invention and be encoded on various computer readable storage media, suitable media include magnetic disk or tape, optical storage media such as compact disk or DVD (digital versatile disk), flash memory, and the like. Computer readable media encoded with the program code may be packaged with a compatible device or provided separately from other devices. Program code may also be encoded and transmitted using carrier signals (e.g., via Internet download) adapted for transmission via wired, optical, and/or wireless networks conforming to a variety of protocols, including the Internet.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

We claim:

1. A method for verifying an integrity of a coherent shared memory using inline coding, the coherent shared memory comprising a plurality of memory units, the plurality of memory units being accessed by a plurality of bus masters, the method comprising:
   performing an active stage step, wherein the active stage step comprises:
      writing, by each of the plurality of bus masters, a corresponding data from a cache memory of each bus master to at least one memory unit from the plurality of memory units, wherein each bus master includes a separate cache memory;
      updating, within a status database, a status corresponding to the at least one memory unit to a modified state;
   in response to performing the active stage step, performing a rewriting stage step comprising rewriting contents of the corresponding data from each cache memory of each of the plurality of bus masters to the at least one memory unit of the plurality of memory units; and
   in response to performing the rewriting stage step, performing a verification stage step, wherein the verification stage step comprises:
      each of the plurality of bus masters reading back data written by each of the plurality of bus masters, from the at least one memory unit;
      comparing the data read back by each of the plurality of bus masters, with an expected data written in the at least one memory unit, wherein the expected data written is substantially similar to the corresponding data, and wherein the expected data is data which has been written by the plurality of bus masters during the active step; and
      updating and/or maintaining the status corresponding to the at least one memory unit in the status database to at least one of:
         a verified state, on the event of a match being found between the data read back and the expected data written, by at least one of the plurality of bus masters; and
         the modified state, on the event of a mismatch between the data read back and the expected data written by at least one of the plurality of bus masters.

2. The method according to claim 1, wherein the plurality of bus masters is any one of a PPC440, PPC464, PPC476 and DMA.

3. The method according to claim 1, wherein the coherent shared memory is any one of a DDR1, DDR2, DDR3 and SRAM memory.

4. The method according to claim 1, wherein the plurality of memory units are any one of 4, 8, 16, 32, 64, 128, 256 or 512 bits.

5. The method according to claim 1, wherein an entry to the status database is a 4, 8, 16, 32, 64, 128, 256, or 512 bits-wide.

6. A system for verifying an integrity of a coherent shared memory using inline coding, the coherent shared memory comprising a plurality of memory units, the plurality of memory units being accessed by a plurality of bus masters, the plurality of bus masters each having a cache memory, the system comprising:
   a write module that:
      writes, by each of the plurality of bus masters, a corresponding data from a cache memory of each bus master to at least one memory unit from the plurality of memory units; and
      in response to writing, by each of the plurality of bus masters, the corresponding data to the at least one memory unit and updating a status corresponding to the at least one memory unit in a status database, rewriting contents of the corresponding data from each cache memory of each of the plurality of bus masters to the at least one memory unit of the plurality of memory units;
   a read module that reads back data written by each of the plurality of bus masters, from the at least one memory unit;
   a compare module that matches the data read back by each of the plurality of bus masters, with an expected data written in the at least one memory unit, wherein the expected data written is substantially similar to the corresponding data, and wherein the expected data is data which has been written by the plurality of bus masters through the write module; and
   an update module that updates and/or maintains the status corresponding to the at least one memory unit in the status database, wherein the update module:
      updates the status corresponding to the at least one memory unit in the status database to a modified state when the corresponding data is written by each of the plurality of bus masters;
      updates the status database for the at least one memory unit to verified, on the event of a match being found between the data read back and the expected data written, by at least one of the plurality of bus masters; and
      maintains the status database for the at least one memory unit to the modified state, on the event of a mismatch being found between the data read back and the expected data written, by at least one of the plurality of bus masters.

7. The system according to claim 6, wherein the plurality of bus masters is any one of a PPC440, PPC464, PPC476, and a DMA.

8. The system according to claim 6, wherein the coherent shared memory is any one of a DDR1, DDR2 or a DDR3 memory.

9. The system according to claim 6, wherein the plurality of memory units are any one of 4, 8, 16, 32, 64, 128, 256, or 512 bits.

10. The system according to claim 6, wherein an entry to the status database is a 4, 8, 16, 32, 64, 128, 256, or 512 bits-wide word.

11. A computer program product comprising a non-transitory computer readable medium, the non-transitory computer readable medium comprising an inline code used for verifying an integrity of a coherent shared memory, the coherent shared memory comprises a plurality of memory units, the plurality of memory units being accessed by a plurality of bus masters, the plurality of bus masters each having a separate cache memory, the computer program product comprising instructions for:
   performing an active stage step, wherein the active stage step comprises:

writing, by each of the plurality of bus masters, a corresponding data from a cache memory of each bus master to at least one memory unit from the plurality of memory units;

updating, within a status database, a status corresponding to the at least one memory unit to a modified state;

in response to performing the active stage step, performing a rewriting stage step comprising rewriting contents of the corresponding data from each cache memory of each of the plurality of bus masters to the at least one memory unit of the plurality of memory units; and in response to performing the rewriting stage step, performing a verification stage step, wherein the verification stage step comprises:

each of the plurality of bus masters reading back data written by each of the plurality of bus masters, from the at least one memory unit;

comparing the data read back by each of the plurality of bus masters, with an expected data written in the at least one memory unit, wherein the expected data written is substantially similar to the corresponding data, and wherein the expected data is data which has been written by the plurality of bus masters during the active step; and updating and/or maintaining the status corresponding to the at least one memory unit in the status database to at least one of:

a verified state, on the event of a match being found between the data read back and the expected data written, by at least one of the plurality of bus masters; and the modified state, on the event of a mismatch between the data read back and the expected data written by at least one of the plurality of bus masters.

12. The computer program product of claim 11, wherein the plurality of bus masters is any one of a PPC440, PPC464, PPC476 and a DMA.

13. The computer program product of claim 11, wherein the coherent shared memory is any one of a DDR1, a DDR2, a DDR3 and a SRAM memory.

14. The computer program product of claim 11, wherein the plurality of memory units are any one of 4, 8, 16, 32, 64, 128, 256, or 512 bits.

15. The computer program product of claim 11, wherein an entry to the status database is a 4, 8, 16, 32, 64, 128, 256, or 512 bits-wide word.

16. The method according to claim 1, wherein the plurality of bus masters comprises at least a first one or more bus masters and a second bus master, the method further comprising:

updating and maintaining the status corresponding to the at least one memory unit in the status database to the verified state, on the event of a mismatch between the data read back and the expected data written by at least one of the first one or more bus masters and a match being found between the data read back and the expected data written by the second bus master, wherein the second bus master has most recently written the corresponding data to the at least one memory unit.

17. The system according to claim 6, wherein the plurality of bus masters comprises at least a first one or more bus masters and a second bus master, wherein the update module:

updates and maintains the status corresponding to the at least one memory unit in the status database to the verified state, on the event of a mismatch between the data read back and the expected data written by at least one of the first one or more bus masters and a match being found between the data read back and the expected data written by the second bus master, wherein the second bus master has most recently written the corresponding data to the at least one memory unit;

wherein the data read back by each particular bus master of the plurality of bus masters comprises all data written in all of the plurality of memory units that the particular bus master previously accessed.

18. The computer program product of claim 11, wherein the plurality of bus masters comprises at least a first one or more bus masters and a second bus master, the instructions further comprising instructions for:

updating and maintaining the status corresponding to the at least one memory unit in the status database to the verified state, on the event of a mismatch between the data read back and the expected data written by at least one of the first one or more bus masters and a match being found between the data read back and the expected data written by the second bus master, wherein the second bus master has most recently written the corresponding data to the at least one memory unit;

wherein the data read back by each particular bus master of the plurality of bus masters comprises all data written in all of the plurality of memory units that the particular bus master previously accessed.

19. The method according to claim 1, wherein the data read back by each particular bus master of the plurality of bus masters comprises all data written in all of the plurality of memory units that the particular bus master previously accessed.

* * * * *